United States Patent [19]

Taleyarkhan

[11] Patent Number: 4,738,819
[45] Date of Patent: Apr. 19, 1988

[54] BOILING WATER NUCLEAR REACTOR FUEL ASSEMBLY WITH CROSS-FLOW ELIMINATION AT UPPER SPACER LOCATIONS

[75] Inventor: Rusi P. Taleyarkhan, Pittsburgh, Pa.

[73] Assignee: Westinghouse Electric Corp., Pittsburgh, Pa.

[21] Appl. No.: 886,843

[22] Filed: Jul. 18, 1986

[51] Int. Cl.⁴ .................. G21C 3/32; G21C 15/00
[52] U.S. Cl. .................. 376/444; 376/352; 376/446
[58] Field of Search ............ 376/444, 352, 446, 445, 376/438, 362, 364, 442, 440

[56] References Cited

U.S. PATENT DOCUMENTS

| | | | |
|---|---|---|---|
| 3,802,995 | 4/1974 | Fritz et al. | 176/76 |
| 4,585,616 | 4/1986 | De Mario | 376/444 |
| 4,649,021 | 3/1987 | Taleyarkhan | 376/444 |

FOREIGN PATENT DOCUMENTS 1150423 7/1983 Canada .................. 359/76

Primary Examiner—Donald P. Walsh

[57] ABSTRACT

A BWR fuel assembly having an array of spaced fuel rods, an outer tubular flow channel surrounding the fuel rods so as to direct flow of coolant/moderator fluid along the fuel rods, and a hollow central water cross extending through the channel and composed of radially extending members dividing the fuel rods into separate fuel rod mini-bundle subassemblies, includes features which eliminate or at least minimize degradation of CHF performance and the penalties and uncertainties associated therewith. Each subassembly has spacers which surround its fuel rods and maintain them in side-by-side spaced relationship. The spacers are axially displaced apart between the bottom and top of the subassembly. Each radial member of the water cross is connected at multiple segments along its outer longitudinal edge to the channel so as to define a series of spaced apart openings between the members and channel which allow cross-flow communication of coolant/moderator fluid between the adjacent ones of the mini-bundle subassemblies for pressure equalization therebetween. The features of the present invention incorporated in the BWR fuel assembly, which eliminate or at least minimize degradation of CHF performance, are solid continuous ribs, welds or bars extending between and interconnecting the channel and water cross radial members at the locations of the upper ones of the spacers for blocking portions of the coolant/moderator fluid cross-flow between the separated mini-bundles at such locations.

7 Claims, 5 Drawing Sheets

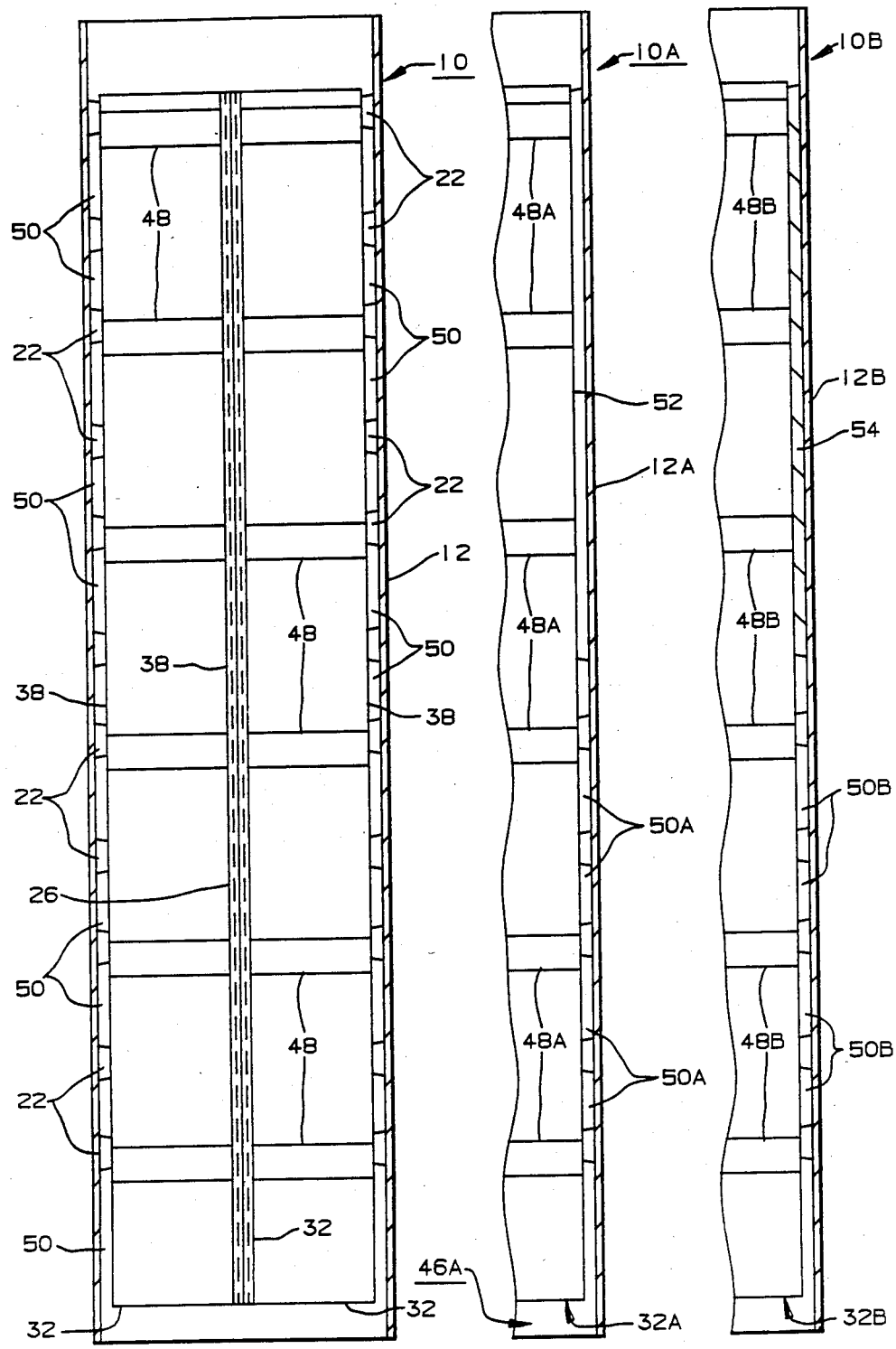

BOILING WATER NUCLEAR REACTOR FUEL ASSEMBLY WITH CROSS-FLOW ELIMINATION AT UPPER SPACER LOCATIONS

CROSS REFERENCE TO RELATED APPLICATIONS

Reference is hereby made to the following copending applications dealing with related subject matter and assigned to the assignee of the present invention:

1. "Nuclear Fuel Assembly" by Robert F. Barry et al, assigned U.S. Ser. No. 368,555 and filed Apr. 15, 1982.

2. "Coolant Flow Paths Within A Nuclear Fuel Assembly" by Pratap K. Doshi, assigned U.S. Ser. No. 602,089 and filed Apr. 19, 1984, a continuation of U.S. Ser. No. 368,552, filed Apr. 15, 1982 and now abandoned.

3. "Cross Brace For Stiffening A Water Cross In a Fuel Assembly" by C. K. Lui, assigned U.S. Ser. No. 672,042 and filed Nov. 16, 1984.

4. "Improved Boiling Water Nuclear Reactor Fuel Assembly" by Rusi Taleyarkhan, assigned U.S. Ser. No. 726,602 and filed May 2, 1985.

BACKGROUND OF THE INVENTION

1. Field of the Invention

The present invention relates generally to fuel assemblies for a nuclear reactor and, more particularly, is concerned with a boiling water reactor (BWR) fuel assembly incorporating features which eliminate large cross-flows between fuel rod mini-bundles at upper spacer locations to avoid degradation of critical heat flux (CHF) performance.

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

In nuclear reactors generally, a plurality of the fuel rods are grouped together to form a fuel assembly. A number of such fuel assemblies are typically arranged in a matrix to form a nuclear reactor core capable of a self-sustained, nuclear fission reaction. The core is submersed in a flowing liquid, such as light water, that serves as the coolant for removing heat from the fuel rods and as a neutron moderator. Specifically, in a BWR the fuel assemblies are typically grouped in clusters of four with one control rod associated with each four assemblies. The control rod is insertable within the fuel assemblies for controlling the reactivity of the core. Each such cluster of four fuel assemblies surrounding a control rod is commonly referred to as a fuel cell of the reactor core.

A typical BWR fuel assembly in the cluster is ordinarily formed by a N by N array of the elongated fuel rods. The bundle of fuel rods are supported in laterally spaced-apart relation and encircled by an outer tubular channel having a generally rectangular cross-section. Examples of such fuel assemblies are illustrated and described in U.S. Pat. Nos. 3,689,358 to Smith et al and 3,802,995 to Fritz et al and Canadian Pat. No. 1,150,423 to Anderson et al, as well as in the patent applications cross-referenced above.

In a fuel assembly of this type the fuel rods in the central region of the bundle thereof may be under-moderated and overenriched. In order to remedy this condition by increasing the flow of moderator water through this region of the assembly, several arrangements have been proposed. In the Fritz et al patent, one or more elongated empty rods are substituted for fuel rods in the central region of the assembly. In the Anderson et al patent, an elongated centrally-disposed stiffening device with vertical water passageways is used in the assembly. In the above cross-referenced Barry et al, Doshi and Lui patent applications, an elongated centrally-disposed water cross is used in the assembly.

As disclosed in the aforementioned latter four cross-referenced applications, the water cross has a plurality of four radial panels, forming a cruciform water flow channel, which divide the fuel assembly into four, separate elongated compartments, with the bundle of fuel rods being divided into mini-bundles supported by axially displaced grids or spacers and upper and lower tie plates disposed in the respective compartments. The cruciform water flow channel provides a centrally-disposed cross-shaped path for the flow of subcooled neutron moderator water within the channel along the lengths of, but separate from, adjacent fuel rods in the mini-bundles thereof.

In the above cross-referenced applications, the radial panels of the water cross are interconnected to the sides of the outer flow channel to support the water cross. However, it is considered advantageous to provide some means to permit coolant flow transversely between the separate minibundles of fuel rods of the fuel assembly to provide hydraulic pressure equalization therebetween. For example, in the Taleyarkhan application, pressure equalization openings permitting cross-flow between the compartments are defined between vertically spaced ribs formed in the sides of the outer flow channel which connect to the outer edges of the water cross panels.

Notwithstanding the improvements fostered by the cruciform water cross flow channel of the above cross-referenced applications with respect to hydraulic pressure equalization between the fuel rod mini-bundles in the separate compartments, other problems have recently been recognized which, if left unresolved, will cause degradation in CHF performance. These problems relate to certain of the openings which allow cross-flow communication of two phase (steam/water) coolant between the mini-bundles in order to achieve the desired flow stability and pressure equalization. At the locations of the fuel rod mini-bundle spacers, this cross-flow between the compartments can rise to large values and degrade CHF performance. The CHF phenomenon in BWRs is of paramount importance in characterizing the power rating of the plant. Hence degradation of this margin should be minimized.

Consequently, the need exists for further improvement of the BWR fuel assembly to eliminate or minimize CHF margin penalties and uncertainties.

SUMMARY OF THE INVENTION

The present invention provides features which are designed to satisfy the aforementioned needs. These features block portions of the coolant cross-flow between mini-bundles so as to eliminate degradation of CHF performance and the penalties and uncertainties associated therewith, without adversely affecting the benefits to be gained from the degree of cross-flow that remains.

It has been discovered that cross-flows between mini-bundles are relatively small at all places except around the spacer locations and that CHF occurs predominantly at the top three spacers locations. The solution of the present invention is to provide lateral flow blockage of pressure equalization openings around the top three spacer locations. This will eliminate sudden or large cross flows at these locations, essentially eliminating or minimizing CHF margin penalties while simultaneously preserving the overall benefits of cross-flow communication between mini-bundles (i.e., stability, reduction of flow maldistribution, pressure equalization). The solution of the present invention would also permit one-dimensional thermal hydraulic analysis thereby leading to further substantial reduction in uncertainties and savings in licensing complexity over multi-dimensional analysis which was required but has not been possible to carry out. Also, in addition to vastly improved thermal hydraulic design allowing a single one-dimensional analysis, improved structural integrity and reduced flow induced vibration result.

Accordingly, the present invention sets forth improved features in a BWR fuel assembly. The fuel assembly includes an array of spaced fuel rods, an outer tubular flow channel surrounding the fuel rods so as to direct flow of coolant/moderator fluid therealong, and a water cross extending through the channel and having a plurality of radially extending members dividing the array of fuel rods into a plurality of separate fuel rod mini-bundle subassemblies. Each radial member is connected at multiple segments along its outer longitudinal edge to the channel so as to define a series of spaced apart openings between the member and channel which allow cross-flow of coolant/moderator between adjacent subassemblies for pressure equalization therebetween. Each subassembly has a plurality of spacers being displaced from one another along the length of the subassembly between the bottom and top thereof and surrounding the fuel rods thereof so as to maintain them in side-by-side spaced relationship.

The features of the present invention incorporated in the BWR fuel assembly relate to means interconnecting each water cross radial member with the channel for closing predetermined ones of the openings at upper ones of the spacers for blocking portions of the coolant/moderator cross-flow between the separate mini-bundles so as to eliminate or at least minimize degradation of CHF perforamnce and resulting penalties and uncertainties associated therewith.

More particularly, the cross-flow blocking means is in the form of a solid continuous structure impervious to cross-flow and interconnecting each radial member with the channel. In one embodiment, the blocking means is a continuous rib formed in the channel and connected to a respective one of the water cross radial members. The rib extends along the channel through a distance which encompasses the regions of the adjacent subassemblies occupied by the upper ones of the spacers, which preferably are three in number. In another embodiment, the blocking means is a continuous weld or bar interconnecting the channel with a respective one of the water cross radial members. The weld or bar extends along the channel through a distance which encompasses the regions of the adjacent subassemblies occupied by the upper ones of the spacers.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 7 is a diagrammatic representation of the prior art BWR fuel assembly of FIG. 1, showing a longitudinal section of the outer channel to reveal the axial locations of the mini-bundle spacers relative to the outer channel ribs which connect to the outer edges of the water cross radial panels and the pressure equalization openings defined between the ribs.

FIG. 8 is a diagrammatic representation similar to that of FIG. 7, except illustrating a first embodiment of one of the improved features of the present invention for blocking cross-flow at the levels of the upper three mini-bundle spacers.

FIG. 9 is a diagrammatic representation similar to that of FIG. 8, but illustrating a second embodiment of one of the improved features of the present invention for blocking cross-flow at the levels of the upper three mini-bundle spacers.

DETAILED DESCRIPTION OF THE INVENTION

Figure 1:
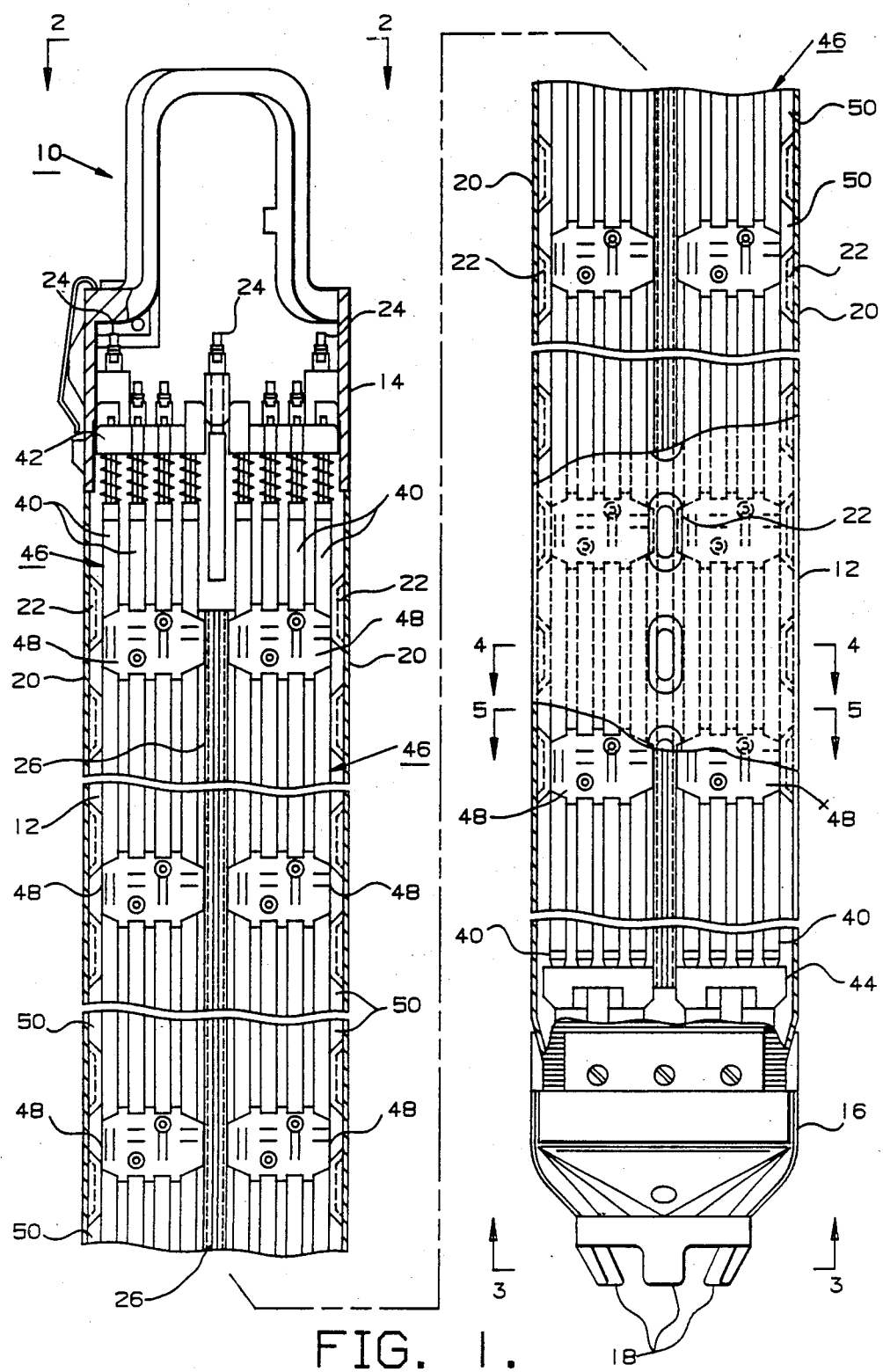
FIG. 1 is an elevational view, with parts broken away and sectioned for clarity, of a prior art BWR nuclear fuel assembly in which the pressure equalization opening are present which allow the increased levels of cross-flow at the mini-bundles spacer locations and consequent degradation in CHF performance.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Figure 2:
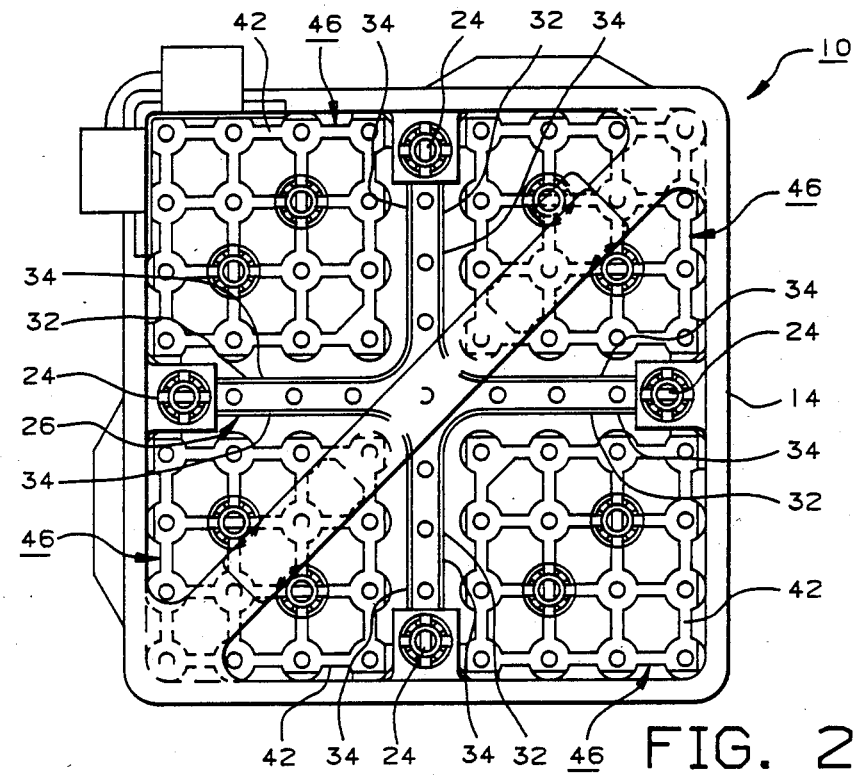
FIG. 2 is an enlarged top plan view of the prior art BWR fuel assembly as seen along line 2—2 of FIG. 1.
Figure 3:
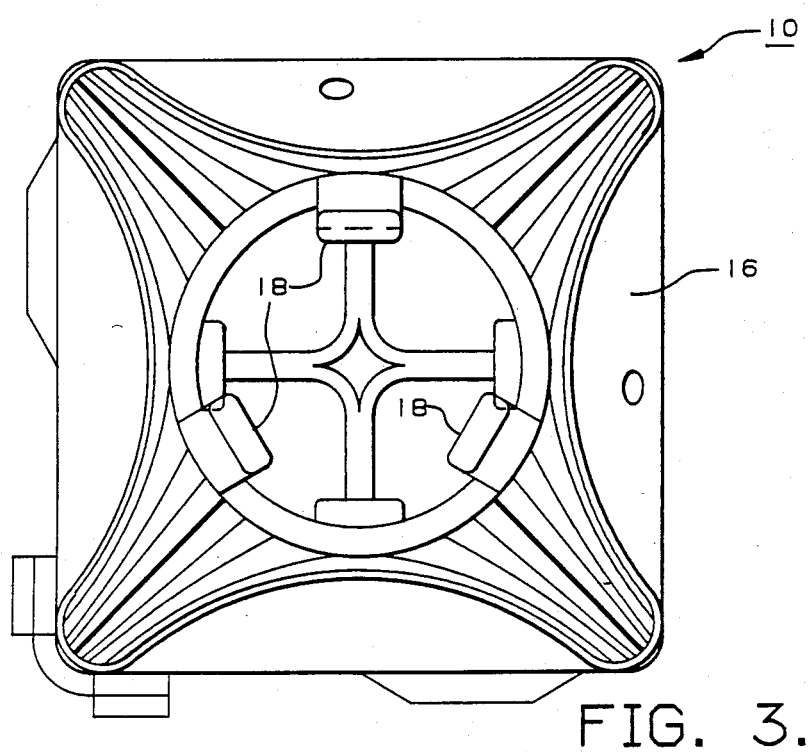
FIG. 3 is an enlarged bottom plane view of the prior art BWR fuel assembly as seen along line 3—3 of FIG. 1.
Figure 4:
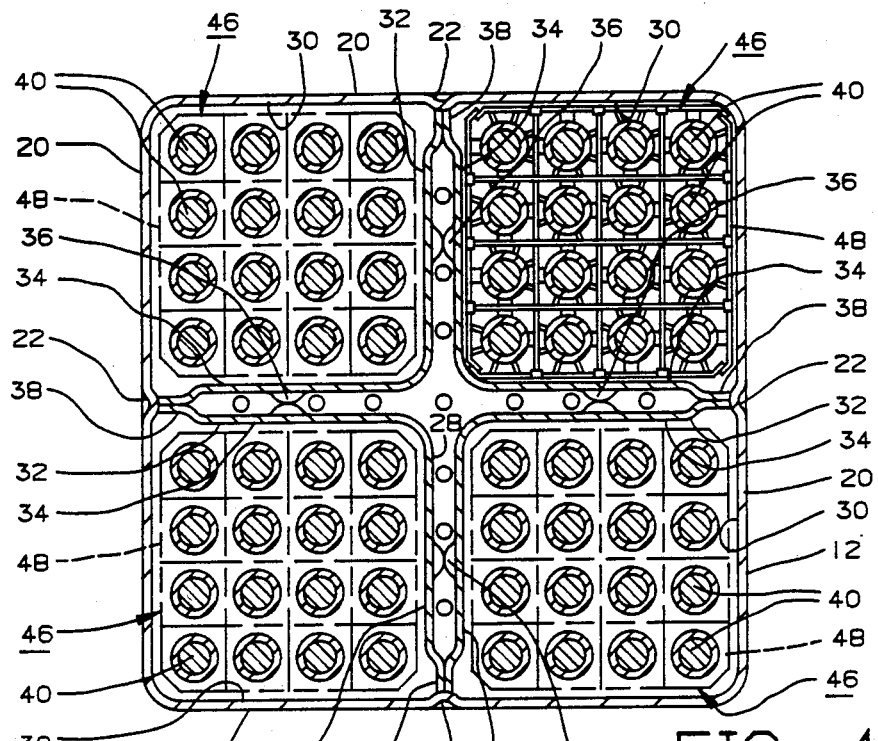
FIG. 4 is a cross-sectional view of the prior art BWR fuel assembly taken along line 4—4 of FIG. 1, showing the fuel rod bundle of the fuel assembly being separated into separate mini-bundles by the water cross with a grid surrounding one of the mini-bundles being shown in full, while the grids surrounding the other three mini-bundles are shown in outline form and also showing the connections between the radial panels of the water cross and the spaced outer flow channel ribs being shown in cross section.
Figure 5:
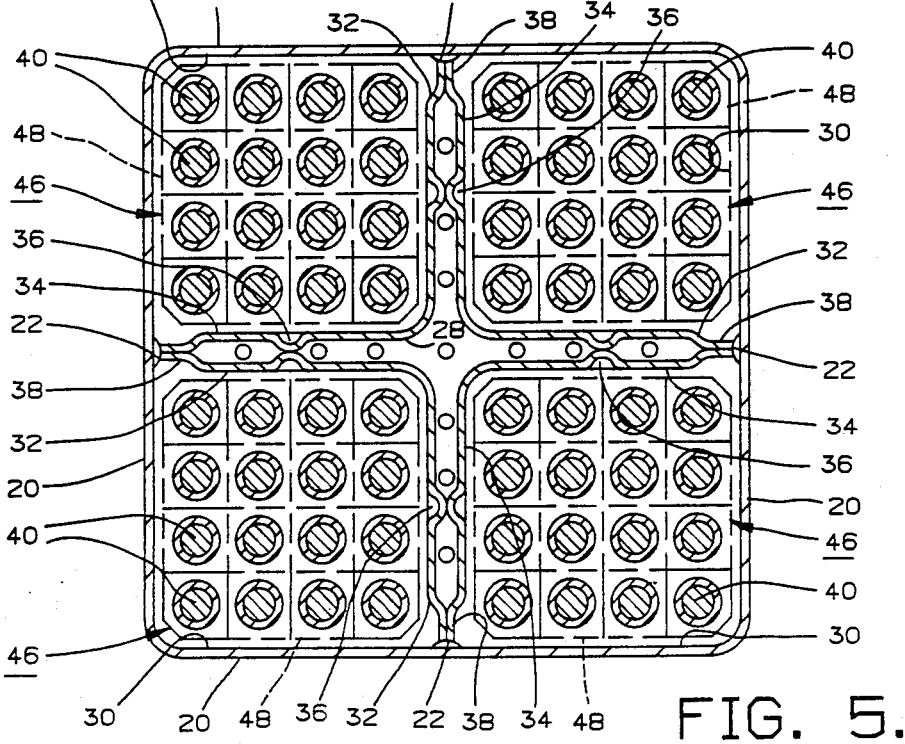
FIG. 5 is another cross-sectional view of the prior art BWR fuel assembly similar to that of FIG. 4, but taken along line 5—5 of FIG. 1 in order to show in full the spaced ribs on the outer channel to which are attached the outer edges of the water cross panels.
Figure 6:
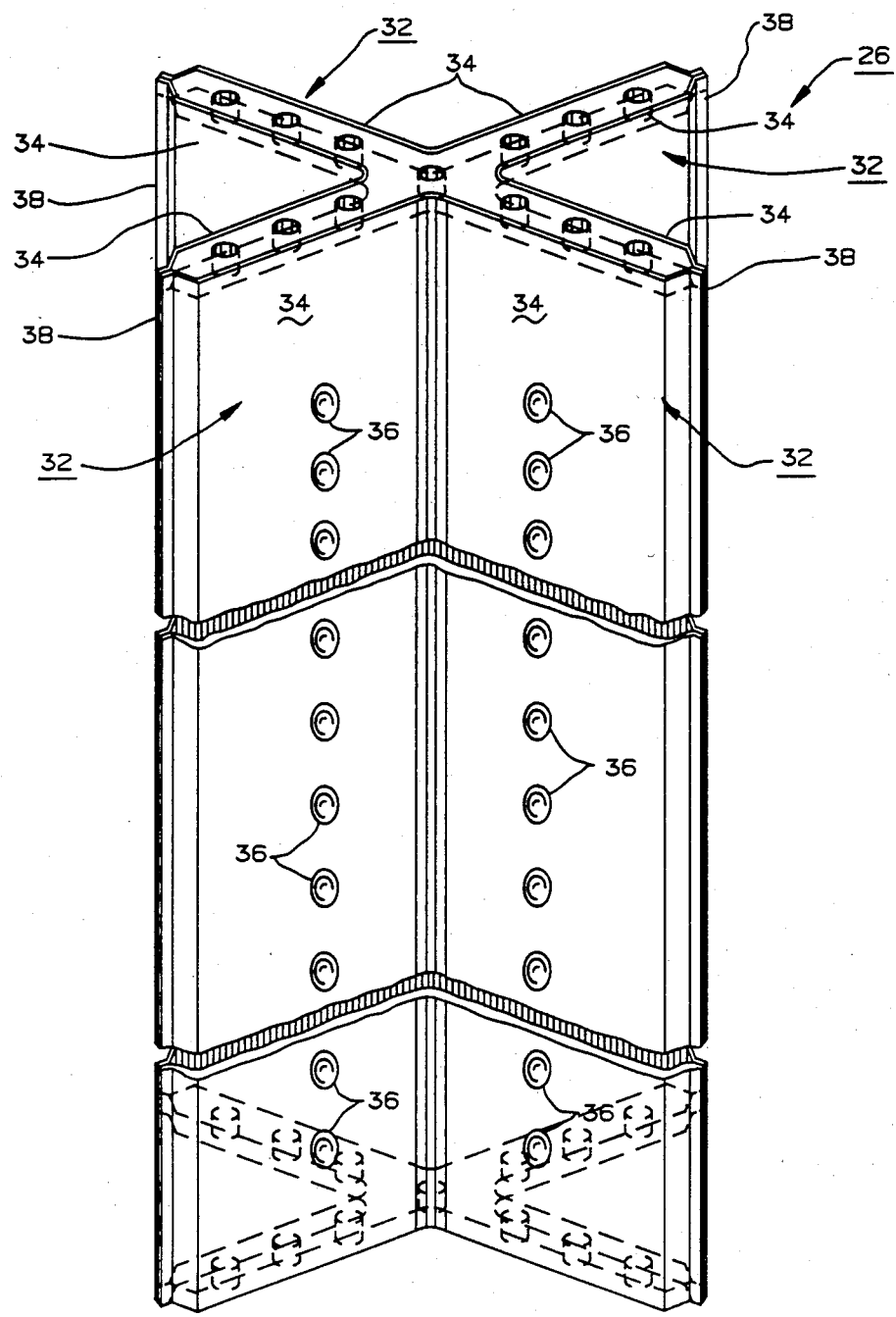
FIG. 6 is an enlarged perspective view, with parts broken away for clarity, of the water cross of the prior art BWR fuel assembly of FIG. 1.

Referring now to the drawings, and particularly to FIGS. 1 to 7, there is shown a prior art nuclear fuel assembly, generally designated 10, for a BWR to which the improved features of the present invention can be advantageously applied. The fuel assembly 10 includes an elongated outer tubular flow channel 12 that extends along substantially the entire length of the fuel assembly 10 and interconnects an upper support fixture or top nozzle 14 with a lower base or bottom nozzle 16. The bottom nozzle 16 which serves as an inlet for coolant flow into the outer channel 12 of the fuel assembly 10 includes a plurality of legs 18 for guiding the bottom nozzle 16 and the fuel assembly 10 into a reactor core support plate (not shown) or into fuel storage racks, for example in a spent fuel pool.

The outer flow channel 12 generally of rectangular cross-section is made up of four interconnected vertical walls 20 each being displaced about ninety degrees one from the next. Formed in a spaced apart relationship in, an extending in a vertical row at a central location along, the inner surface of each wall 20 of the outer flow channel 12, is a plurality of structural ribs 22. The outer flow channel 12, and thus the ribs 22 formed therein, are preferably formed from a metal material, such as an alloy of zirconium, commonly referred to as Zircaloy. Above the upper ends of the structural ribs 22, a plurality of upwardly-extending attachment studs 24 fixed on the walls 20 of the outer flow channel 12 are used to interconnect the top nozzle 14 to the channel 12.

For improving neutron moderation and economy, a hollow water cross, generally designated 26, extends axially through the outer channel 12 so as to provide an open inner channel 28 for subcooled moderator flow through the fuel assembly 10 and to divide the fuel assembly into four, separate, elongated compartments 30. The water cross 26 has a plurality of four radial panels 32 composed by a plurality of four, elongated, generally L-shaped, metal angles or sheet members 34 that extend generally along the entire length of the channel 12 and are interconnected and spaced apart by a series of elements in the form of dimples 36 formed in the sheet members 34 of each panel 32 and extending therebetween. The dimples 36 are formed in and disposed in a vertical column (FIG. 6) along the axial length of the sheet members 34. Preferably, the dimples 36 in each of the sheet members 34 are laterally and vertically aligned with corresponding dimples 36 in adjacent sheet members 34 in order to provide pairs of opposed dimples that contact each other along the lengths of the sheet members to maintain the facing portions of the members in a proper spaced-apart relationship. The pairs of contacting dimples 36 are connected together such as by welding to ensure that the spacing between the sheet members 34 forming the panels 32 of the central water cross 26 is accurately maintained.

The hollow water cross 26 is mounted to the angularly-displaced walls 20 of the outer channel 12. Preferably, the outer, elongated longitudinal edges 38 of the panels 32 of the water cross 26 are connected such as by welding to the structural ribs 22 along the lengths thereof in order to securely retain the water cross 26 in its desired central position within the fuel assembly 10. Further, the inner ends of the panels together with the outer ends thereof define the inner central cruciform channel 28 which extends the axial length of the hollow water cross 26.

Disposed within the channel 12 is a bundle of fuel rods 40 which, in the illustrated embodiment, number sixty-four and form a 8×8 array. The fuel rod bundle is, in turn, separated into four mini-bundles thereof by the water cross 26. The fuel rods 40 of each mini-bundle, such being sixteen in number in a 4×4 array, extend in laterally spaced apart relationship between an upper tie plate 42 and a lower tie plate 44 and connected together with the tie plates comprise a separate fuel rod subassembly 46 within each of the compartments 30 of the channel 12. A plurality of grids or spacers 48 axially spaced along the fuel rods 40 of each fuel rod subassembly 46 maintain the fuel rods in their laterally spaced relationships. Coolant flow paths and cross-flow communication are provided between the fuel rod subassemblies 46 in the respective separate compartments 30 of the fuel assembly 10 by a plurality of openings 50 formed between each of the structural ribs 22 along the lengths thereof. Coolant flow through the openings 50 serves to equalize the hydraulic pressure between the four separate compartments 30, thereby minimizing the possibility of thermal hydrodynamic instability between the separate fuel rod subassemblies 46.

The above-described basic components of the BWR fuel assembly 10 are known in the prior art, being disclosed particularly in the patent applications cross-referenced above, and have been discussed in sufficient detail herein to enable one skilled in the art to understand the improvements of the present invention presented hereinafter. For a more detailed description of the construction of the BWR fuel assembly, attention is directed to both of the above cross-referenced Barry et al and Doshi patent applications.

Features for Avoiding CHF Performance Degradation

While the openings 50 allow improved flow stability and pressure equalization, analysis shows that at the spacer locations sharp changes in pressure gradients raise the cross-flow levels between the mini-bundle subassemblies 46 by more than 100 times the nominal cross-flows, becoming comparable to axial mass flow rates in the separate mini-bundle subchannels or compartments 30. This is a large number which can affect and degrade the predicted CHF margin by five to ten percent depending on the operating conditions.

Data shows that such undesirable cross-flow behavior around the locations of the spacers 48 washes off beyond plus or minus approximately three inches of the spacer location. Also, in a BWR, CHF occurs predominantly at the top three spacer locations. Thus, the solution of the present invention is to provide means for blocking lateral flow around the top three spacer locations, at least up to three inches in either direction.

More particularly, two different embodiments of the features of the present invention for accomplishing lateral cross-flow blockage and thereby eliminating or minimizing CHF performance degradation are shown in FIGS. 8 and 9 incorporated in respective BWR fuel assemblies 10A and 10B. The same parts of the fuel assemblies 10A,10B as described previously with respect to the prior art fuel assembly 10 are identified with the same reference numerals but with the addition of either an A or B suffix depending upon whether the part identified is in the fuel assembly 10A or in the fuel assembly 10B.

As seen in FIGS. 8 and 9, each of the respective blocking means which interconnects each water cross radial panel 32A,32B and channel 12A, 12B for closing predetermined ones of the openings 50A,50B at upper ones of the spacers 48A,48B is in the form of a solid continuous structure impervious to cross-flow of moderator/coolant fluid. Specifically, in FIG. 8 the blocking means is a continuous rib 52 formed in the channel 12A and connected to a respective one of the water cross radial panels 32A. Each rib 52 extends along the channel 12A through a distance which encompasses the levels or regions of the adjacent subassemblies 46A occupied by the upper ones of the spacers 48A, preferably the upper three of the spacers 48A. In FIG. 9, the blocking means is a continuous weld or bar 54 interconnecting the channel 12B with a respective one of the water cross radial panels 32B, which covers the same distance as the ribs 52 of FIG. 8.

Due to the continuous connection provided between the water cross panels and the channel at the top three spacer locations or the BWR fuel assembly, it is believed that the water cross and channel will be better coupled and hence improvement in structural integrity can be expected. Also, elimination of large cross-flows at upper spacer locations would lead to an improvement in the area of flow induced structural vibrations. As discussed earlier, the impact on the disclosed BWR fuel assembly thermal hydraulic design would be vastly improved due to elimination of cross-flow related penalties and uncertainties and, as a consequence, allow for enormous reduction in analytical complexity by permitting one-dimensional thermal hydraulic analysis, rather than multi-dimensional analysis (which would require development, qualification and licensing of a code to handle it).

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a fuel assembly having an array of spaced fuel rods, an outer tubular flow channel surrounding said fuel rods so as to direct flow of coolant/moderator fluid therealong, and a water cross extending through said channel and having a plurality of radially extending members dividing the array of fuel rods into a plurality of separate fuel rod mini-bundle subassemblies, each radial member being connected at multiple segments along its outer longitudinal edge to said channel so as to define a series of spaced apart openings between said member and channel which allow cross-flow of coolant/moderator between adjacent subassemblies for pressure equalization therebetween, each subassembly having a plurality of spacers being displaced from one another along the length of said subassembly between the bottom and top thereof and surrounding said fuel rods thereof so as to maintain them in side-by-side spaced relationship, the improvement which comprises:

means interconnecting said each water cross radial member and said channel for closing predetermined ones of said openings adjacent the locations of upper ones of said spacers for blocking portions of said coolant/moderator cross-flow between said separate mini-bundles via said predetermined ones of said openings so as to minimize degradation of CHF performance and resulting penalities and uncertainties associated therewith, said blocking means being in the form of a solid continuous structure impervious to cross-flow and interconnecting said each radial member and said channel adjacent the locations of said upper ones of said spacers.

2. The fuel assembly as recited in claim 1, wherein said blocking means is a continuous rib formed in said channel and connected to a respective one of said water cross radial members, said rib extending along said channel through a distance which encompasses the regions of said adjacent subassemblies occupied by said upper ones of said spacers.

3. The fuel assembly as recited in claim 2, wherein said upper ones of said spacers are three in number.

4. The fuel assembly as recited in claim 1, wherein said blocking means is a continuous weld interconnecting said channel with a respective one of said water cross radial members, said weld extending along said channel through a distance which encompasses the regions of said adjacent subassemblies occupied by said upper ones of said spacers.

5. The fuel assembly as recited in claim 4, wherein said upper ones of said spacers are three in number.

6. The fuel assembly as recited in claim 1, wherein said blocking means is a continuous bar disposed between and interconnecting said channel and respective one of said water cross radial members, said bar extending along said channel through a distance which encompasses the regions of said adjacent subassemblies occupied by said upper ones of said spacers.

7. The fuel assembly as recited in claim 6, wherein said upper ones of said spacers are three in number.

* * * * *